United States Patent
Brenden et al.

(10) Patent No.: US 7,012,396 B1
(45) Date of Patent: Mar. 14, 2006

(54) INCREASED DIGITAL SPINDLE MOTOR CONTROL RESOLUTION THROUGH DITHER

(75) Inventors: Jason P. Brenden, Woodbury, MN (US); James A. Dahlberg, Eagan, MN (US); Jaydip Bhaumik, Rosemount, MN (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/955,774

(22) Filed: Sep. 30, 2004

(51) Int. Cl.
G05B 11/28 (2006.01)
G05B 11/01 (2006.01)
G11B 11/28 (2006.01)

(52) U.S. Cl. .................. 318/599; 318/560; 318/631; 318/625; 360/75; 369/44.13

(58) Field of Classification Search .............. 318/560, 318/599, 631, 625; 369/43, 44.13, 178.01; 360/75, 78.12, 97.01, 78.11, 290
See application file for complete search history.

(56) References Cited

U.S. PATENT DOCUMENTS

| | | | |
|---|---|---|---|
| 4,700,173 A * | 10/1987 | Araki et al. ............ 341/122 |
| 5,543,697 A | 8/1996 | Carobolante et al. |
| 5,631,999 A | 5/1997 | Dinsmore |
| 5,744,928 A | 4/1998 | Tang et al. |
| 5,828,522 A * | 10/1998 | Brown et al. ............ 360/75 |
| 5,859,738 A * | 1/1999 | Forehand et al. ........ 360/75 |
| 5,898,283 A | 4/1999 | Bennett |
| 6,147,848 A * | 11/2000 | Boggs et al. .......... 361/93.2 |
| 6,154,340 A * | 11/2000 | Cameron ................. 360/75 |
| 6,252,362 B1 | 6/2001 | White et al. |
| 6,285,521 B1 | 9/2001 | Hussein |
| 6,498,446 B1 | 12/2002 | Menegoli et al. |
| 6,515,443 B1 | 2/2003 | Kelly et al. |
| 6,577,257 B1 * | 6/2003 | Brooks ................... 341/131 |
| 6,580,236 B1 | 6/2003 | Mitsuda |
| 6,667,598 B1 | 12/2003 | Shimohara |
| 6,710,568 B1 | 3/2004 | Fujii |
| 6,754,151 B1 | 6/2004 | Watt |
| 2003/0085682 A1 | 5/2003 | Hussein |
| 2004/0233084 A1 * | 11/2004 | Brooks ................... 341/131 |

\* cited by examiner

Primary Examiner—David Martin
(74) Attorney, Agent, or Firm—Kinney & Lange, P.A.

(57) ABSTRACT

A motor controller provides pulse width modulated drive signals to a motor. A digital demand code for controlling motor speed is input to the motor controller. A dither generator generates a digital dither value, which an adder adds to the demand code to generate a dithered demand code. A position determining circuit determines a rotational position of the motor. A pulse width modulation controller generates pulse width modulated drive signals with duty cycles controlled as a function of a stored set of waveform coefficients, the dithered demand code, and the rotational position of the motor.

22 Claims, 6 Drawing Sheets

INCREASED DIGITAL SPINDLE MOTOR CONTROL RESOLUTION THROUGH DITHER

CROSS-REFERENCE TO RELATED APPLICATION(S)

None.

BACKGROUND OF THE INVENTION

The present invention relates to a motor controller for spindle motors. In particular, the present invention relates to a digital motor controller having a dithered demand input to increase digital spindle control resolution.

The primary function of a spindle motor controller is to regulate the commutation of the spindle motor, which in turn controls the rotation rate of the spindle motor. This rotation rate is controlled by an external hard disk drive controller which provides the spindle motor controller with a digital demand code indicative of a desired rotational rate of the motor. It is often necessary to maintain very precise control over this rotational rate.

Digital spindle motor controllers offer several advantages over analog motor controllers. For instance, a digital controller is more easily programmed and adapted for use with a wide variety of motors and hard disk drive types. Digital controllers, however, often have limited resolution in their control over the rotational rate of the motor. This limited resolution results from the limited length of the digital words manipulated by the controller in providing drive signals to the motor. Limited resolution also results from having a limited system clock frequency from which to derive drive signals for the motor.

Particularly troublesome is a pulse width modulator used in generating pulse width modulated signals for driving the motor. In creating these signals, the pulse width modulator generally uses an up/down counter to first generate a triangle (or saw-tooth) shaped waveform. This waveform is formed essentially of digital words limited in their resolution by a ratio of the system clock used by the counter as a basis for generating the waveform to the frequency of the pulse width modulation. The pulse width modulator then compares individual digital words of this waveform to a digital word generated by multiplying a shape, or waveform, coefficient retrieved from a look up table and the digital demand code. Because rounding errors will necessarily result from this multiplication, control resolution is reduced because an increase in the digital demand code may not result in an increase in the rotational rate of the motor.

The resolution of the digital words forming the triangle (or saw-tooth) waveform can be increased by either increasing the system clock frequency or decreasing the frequency of the pulse width modulation. Both solutions, however, are undesirable. Increasing the clock frequency would increase power dissipation and/or complicate the design of the motor controller; for instance, a phase-locked loop may be required to generate the clock if the clock frequency is increased substantially. Decreasing the frequency of the pulse width modulation would increase the ripple in the current waveform, which could in turn decrease efficiency, increase distortion, and harm acoustic performance.

BRIEF SUMMARY OF THE INVENTION

A motor controller provides pulse width modulated drive signals to a motor. A digital demand code for controlling motor speed is input to the motor controller. A dither generator generates a digital dither value, which an adder adds to the demand code to generate a dithered demand code. A position determining circuit determines a rotational position of the motor. A pulse width modulation controller generates pulse width modulated drive signals with duty cycles controlled as a function of a stored set of waveform coefficients, the dithered demand code, and the rotational position of the motor.

DETAILED DESCRIPTION

Figure 1:
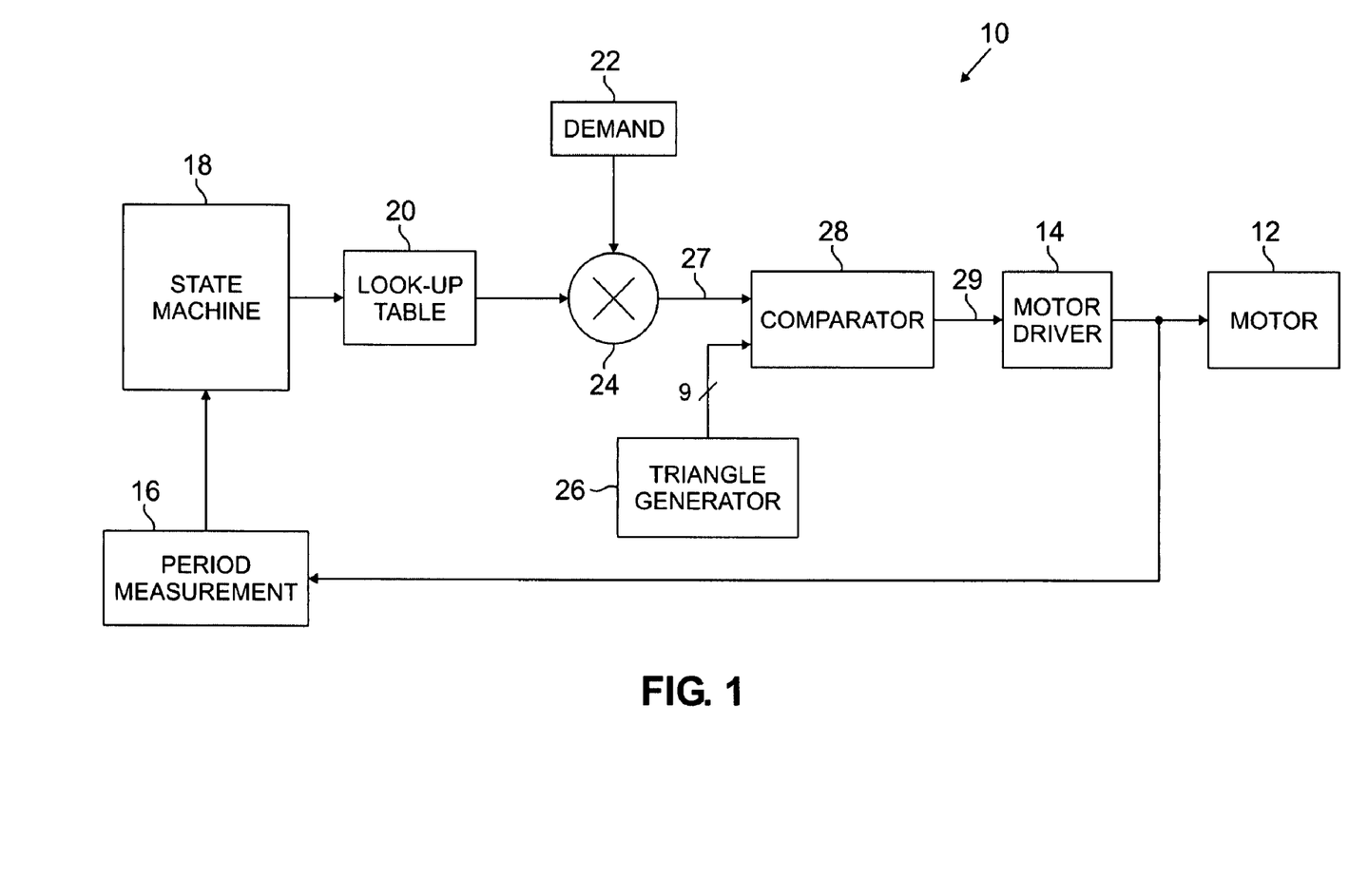
FIG. 1 is a simplified block diagram of a digital spindle motor controller without dither capability for controlling hard disk drive spindle motor.

FIG. 1 is a simplified block diagram of digital spindle motor controller 10 without dither capability for controlling hard disk drive (HDD) spindle motor 12. Motor controller 10 includes motor driver circuitry 14, period measurement circuitry 16, state machine 18, look up table (LUT) 20, demand register 22, demand multiplier 24, triangle generator 26, and comparator 28.

The primary function of digital spindle motor controller 10 is to regulate the commutation of spindle motor 12, which in turn controls the rotation rate of spindle motor 12. It does this by synchronizing and locking to the electrical rotation rate of spindle motor 12.

Spindle motor 12 is a three-phase DC motor having three terminals. Motor driver circuitry 14 supplies drive signals to the terminals of motor 12 to generate current having selected waveforms through a plurality of windings of motor 12. To minimize acoustic noise, a sinusoidally-shaped current is preferably generated through motor 12.

The rotation of spindle motor 12 will induce a back electromagnetic force ("back EMF") signal at each terminal of motor 12. The back EMF signal is a sinusoidal waveform having a period $T_{ROT}$ inversely proportional to the spin rate of motor 12. To detect the back EMF signal at a particular motor terminal, motor driver circuitry 14 suspends driving that terminal (i.e., tri-states the terminal such that it is connected to neither power nor ground) during the time in which the back EMF signal is to be detected. At low spin-up rotation speeds of motor 12, the signal-to-noise ratio of the back EMF signal will be too low from which to obtain reliable information. But once motor 12 attains a threshold rotation speed, the signal-to-noise ratio increases enough that meaningful information can be gleamed from the back EMF signal.

Period measurement circuitry 16 detects zero crossings in the back EMF signal of one terminal of motor 12. A zero crossing occurs each time the back EMF signal changes polarity with respect to the average of the voltages at the motor terminals. The back EMF zero crossings are then used to continuously start and stop period measurements. Period measurement circuitry 16 determines electrical period $T_{ROT}$ of motor 12 by measuring the time between successive zero crossings.

State machine 18 is locked to the rotational speed of motor 12 through period measurement circuitry 16. State machine 18 divides electrical period $T_{ROT}$ into a plurality of commutation states for use in commutating and pulse width modulating motor 12.

LUT 20 contains the waveform, or shape, coefficients necessary to create a desired current waveform through motor 12. To minimize acoustic noise, the desired waveform is preferably sinusoidal in shape. LUT 20 is driven by state machine 18, which sequences through the plurality of states, to output a digital coefficient corresponding the current commutation state.

To control the rotational speed of motor 12, an external HDD controller (not shown in FIG. 1) stores a digital demand code representative of a demanded, or desired, rotational rate of motor 12 in programmable demand register 22. This demand code may be considered a gain adjust code. To increase the rotational rate of motor 12, the external HDD controller increases the value of the digital demand code stored in demand register 22. Likewise, to decrease the rotation rate of motor 12, the value of the digital demand code is decreased.

Demand multiplier 24 multiplies the digital coefficient supplied by LUT 20 for a particular commutation state by the digital demand code stored in demand register 22. The output of demand multiplier is duty cycle control signal 27.

Triangle generator 26 uses a digital up/down counter to generate a triangle waveform. Accordingly, the triangle waveform is formed of a plurality of stepped digital words. In other embodiments, the triangular waveform can be replaced with a saw-tooth or other periodic waveform formed by known methods.

Comparator 28 compares the demand-multiplied coefficients of LUT 20 (duty cycle control signal 27) to the triangle waveform to generate pulse width modulated drive signal 29 supplied to motor driver circuitry 14 for driving motor 12. The duty cycle of the pulse width modulated drive signal 29 is proportional to the amplitude of duty cycle control signal 27.

In generating the triangle waveform, triangle generator 26 is preferably clocked at the system clock rate. If both edges of a 20 MHz system clock are used to generate the triangle waveform, then a frequency of pulse width modulated drive signal 29 will be about 80 KHZ, which is sufficient to keep ripple and distortion in the motor current waveform low.

In the example of FIG. 1, the triangle waveform output by triangle generator 26 is formed of a plurality of stepped 9-bit digital words limited in their resolution by a ratio of a system clock rate used by the counter as a basis for generating the waveform to a frequency of the pulse width modulation. To allow the output of demand multiplier 24 (duty cycle control signal 27) to be compared to the triangle waveform, the output of demand multiplier 24 is also a 9-bit digital word. However, the inputs to demand multiplier 24 are the coefficients of LUT 20, which are 5-bit digital words, and the digital demand code stored in demand register 22, which is a 12-bit digital word. Accordingly, demand multiplier 24 necessarily truncates or rounds the result of its multiplication. Because of this truncation or rounding error, an increase in the digital demand code stored in demand register 22 may not result in an increased rotational rate of motor 12.

Figure 2:
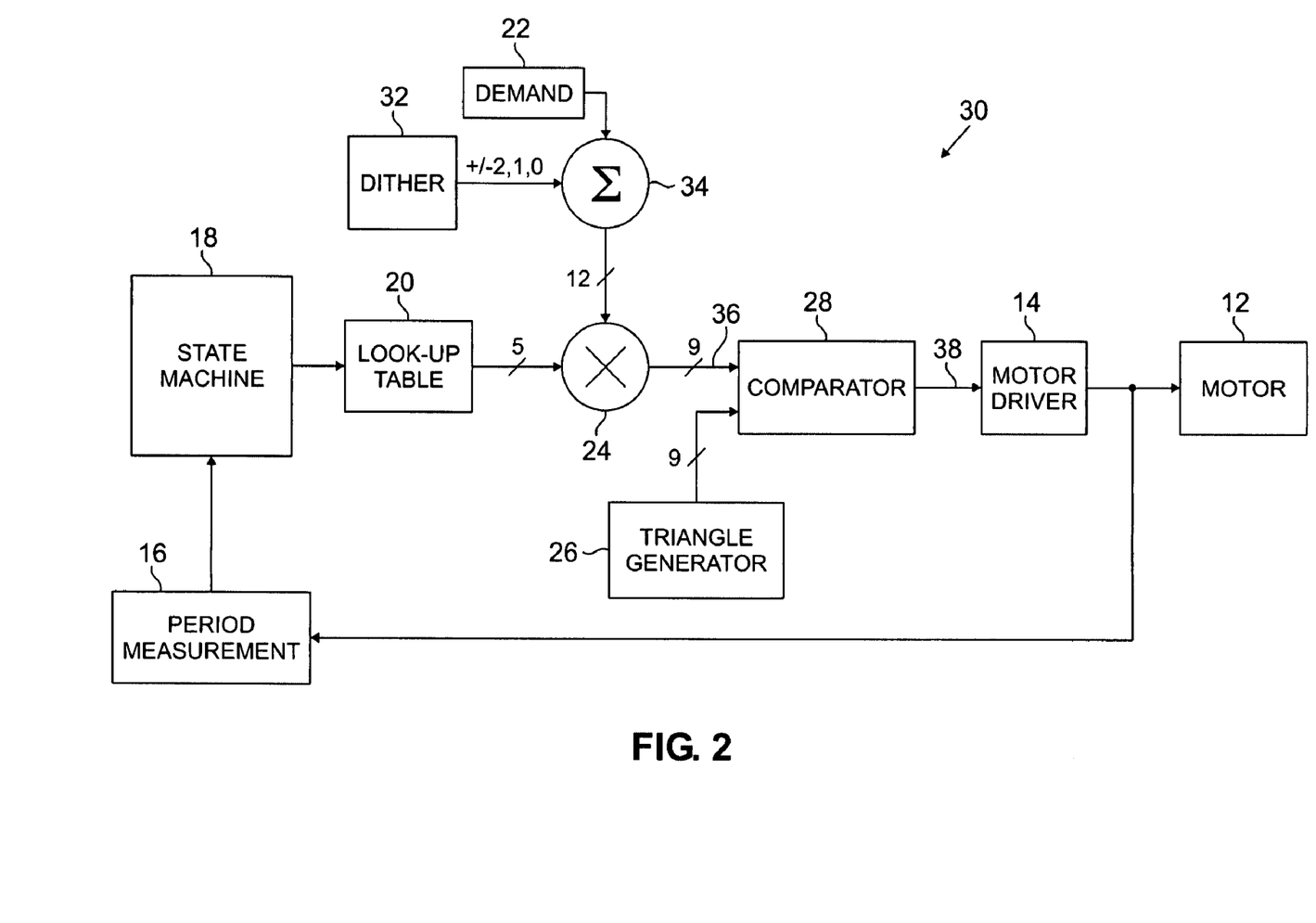
FIG. 2 is a simplified block diagram of digital spindle motor controller capable of dithering a demand code input to the controller in accord with the present invention.

FIG. 2 is a simplified block diagram of digital spindle motor controller 30 capable of dithering a demand code input to the controller in accordance with the present invention. Like motor controller 10 of FIG. 1, motor controller 30 also includes motor driver circuitry 14, period measurement circuitry 16, state machine 18, look up table (LUT) 20, demand register 22, demand multiplier 24, triangle generator 26, and comparator 28. Motor controller 30 also includes dither generator 32 and adder 34 for dithering the digital demand code of demand register 22 prior to the digital demand code being multiplied by the coefficients output by LUT 20.

Motor controller 30 is configured based upon the recognition that, in driving motor 12, it is important that average torque of motor 12 increase with increased demand, and on the recognition that it is not important that every coefficient of LUT 20 be increased with increased demand. By dithering the digital demand code of demand register 22, the rounding and truncating errors that occur as a result of the finite bit length of the output of demand multiplier 24 are averaged over many multiplications. This results in an increase in the effective resolution of the resulting waveform.

In the embodiment of FIG. 2, dither generator 32 is a digital up/down counter that steps through signed digital values, such as nominal values +2, +1, 0, −1 and −2. At higher sample rates, a greater range of signed digital values are generated, such as +4, +3, +2, +1, 0, −1, −2, −3 and −4, for example. Adder 34 then adds the output of dither generator 32 to the digital demand code stored in demand register 22. Demand multiplier 24 then multiplies the coefficients of LUT 20 by the dithered demand code to obtain duty cycle control signal 36.

As with motor controller 10, comparator 28 compares the demand-multiplied coefficients of LUT 20 (duty cycle control signal 36) to the triangle waveform to generate pulse width modulated drive signal 38 supplied to motor driver circuitry 14 for driving motor 12. The duty cycle of the pulse width modulated drive signal 38 is proportional to the amplitude of duty cycle control signal 36.

Figure 3:
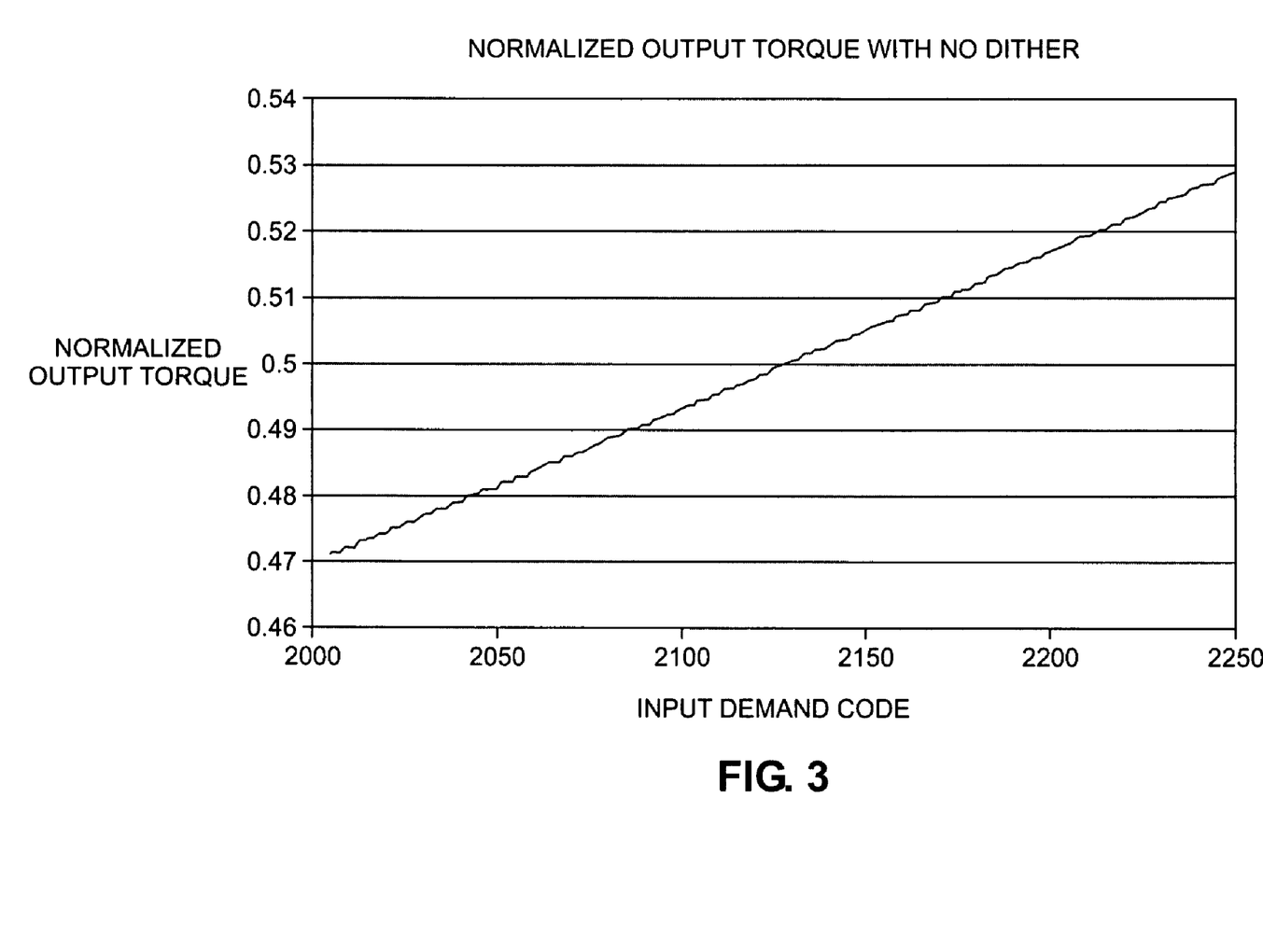
FIGS. 3–6 are graphs illustrating the effect that dithering the demand code has on the performance of a digital spindle motor controller.
Figure 4:
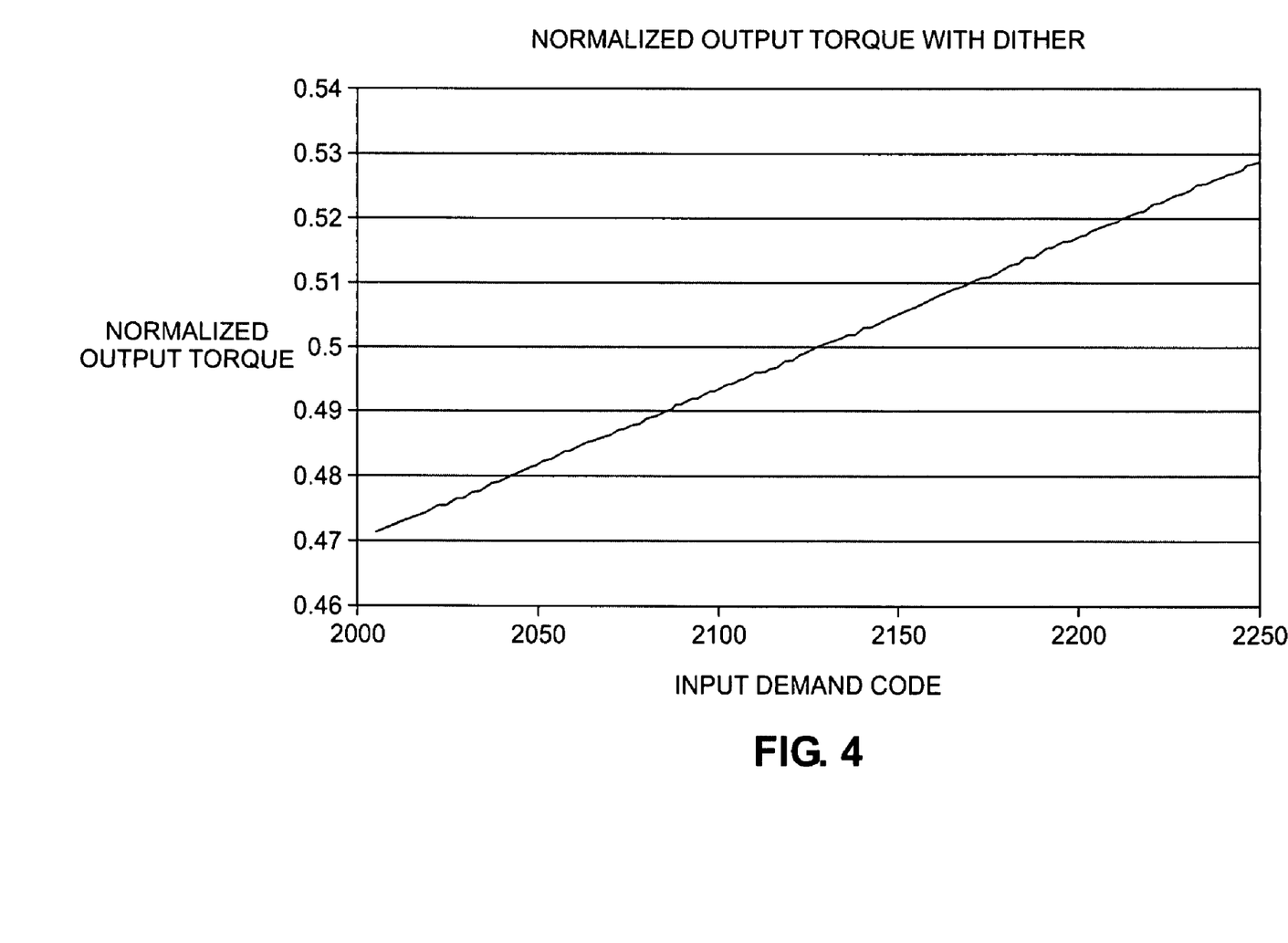

FIGS. 3–6 are graphs illustrating the effect that dithering the demand code input has on the performance of a spindle motor controller. FIGS. 3 and 4 are graphs plotting normalized output torque for motor controllers with (FIG. 4) and without (FIG. 3) the capability to dither demand versus a middle range of input demand codes. FIG. 3, which illustrates performance by the motor controller with undithered demand, contains significantly more flat areas (where the output torque remains unchanged with increased demand) than FIG. 4, which illustrates performance of the motor controller with dithered demand. The dithered version is much more uniform in its transfer function than the undithered version.

Figure 5:
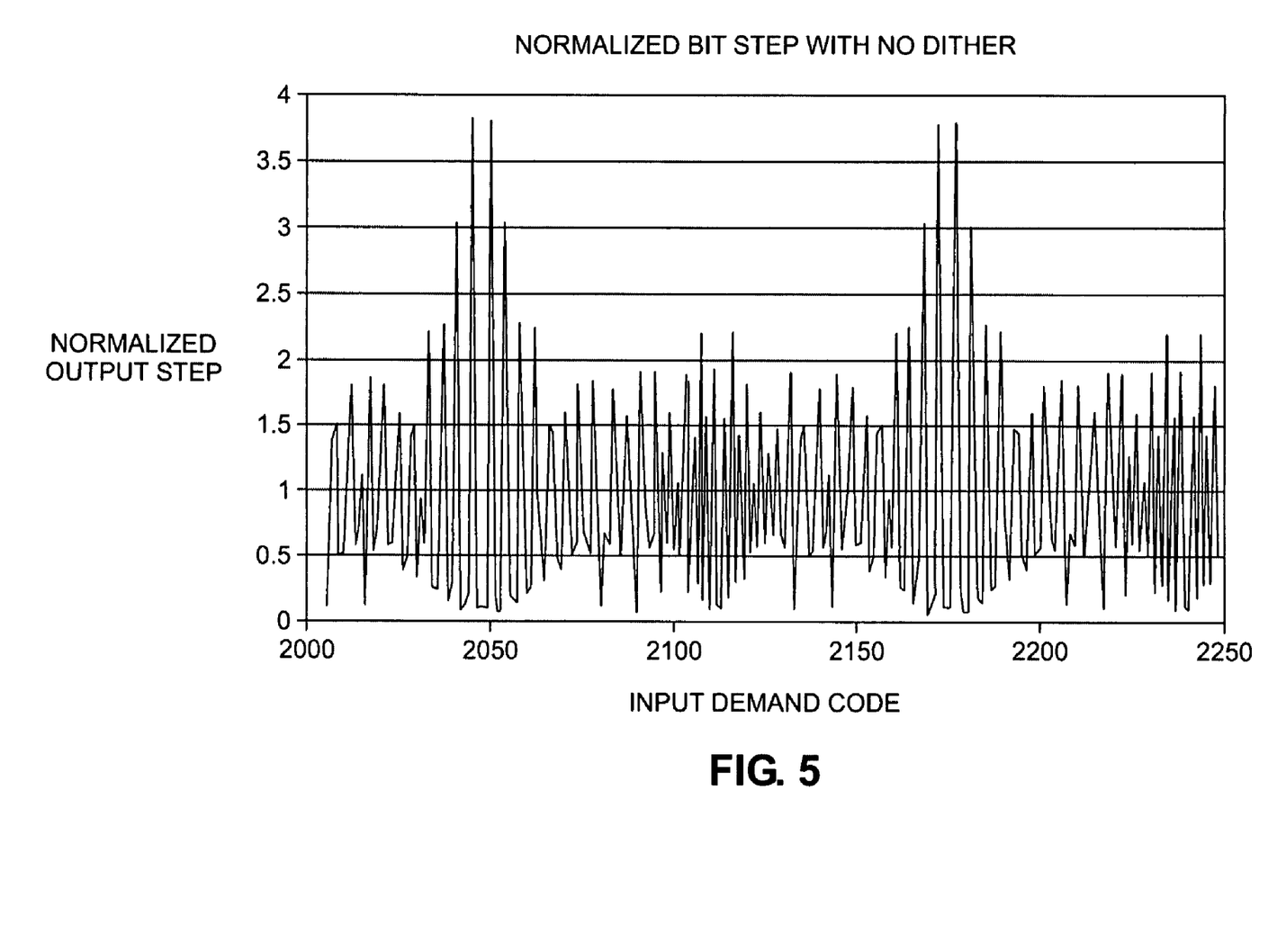
Figure 6:
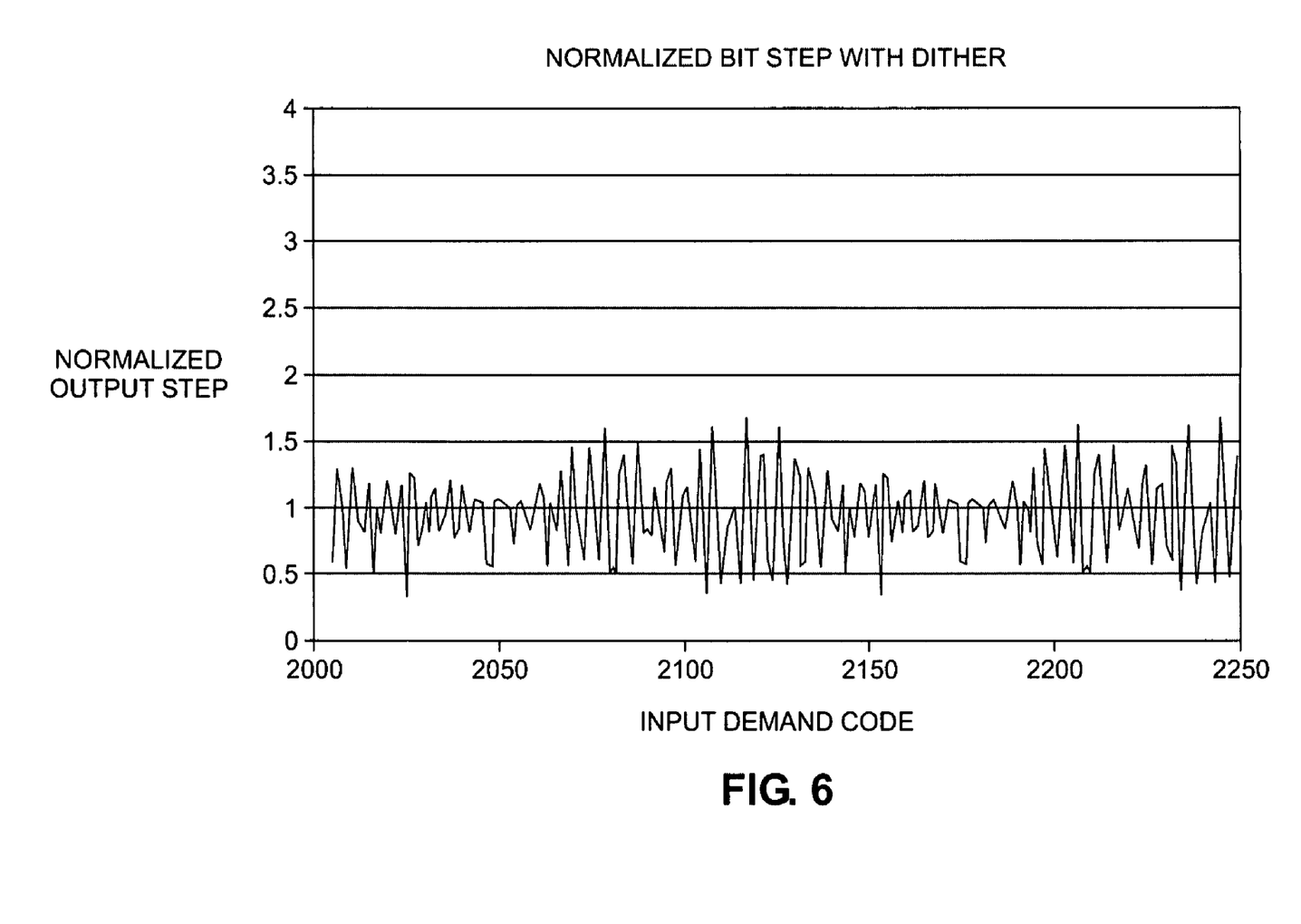

FIGS. 5 and 6 emphasize this performance distinction. FIGS. 5 and 6 are graphs plotting normalized bit steps with (FIG. 6) and without (FIG. 5) the capability to dither demand versus a middle range of input demand codes. As shown in FIG. 5, the normalized step size of the motor controller without dithered demand ranges from close to zero to nearly 4. By contrast, the normalized step size of the motor controller with dithered demand has a significantly smaller range from about 0.3 to about 1.7. Thus, dithering the demand has a dramatic effect on the performance of a digital motor controller.

In summary, by dithering the demand code of a digital spindle motor controller, the effective resolution of the controller can be increased while keeping a high pulse width modulation frequency and a relatively low system clock frequency.

The dithering scheme introduced in the present application is particularly useful in the digital spindle motor controller taught in co-pending U.S. patent application Ser. No.

10/955,981 entitled "Digital Spindle Control Architecture" and filed on even date herewith, which is incorporated by reference herein in its entirety.

It should be noted, however, that the dithering scheme of the present application is not limited in use to HDD spindle motor controllers. In fact, the dithering scheme introduced in the present application can be used in implementing any pulse width modulated motor controller. It can also be used in various other systems that utilize pulse width modulation.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logical gates and chips that could also be implemented by discrete devices, all within the scope and spirit of the present invention.

What is claimed is:

1. A motor controller for providing pulse width modulated drive signals to a motor, the motor controller comprising:
    an input for receiving a digital demand code for controlling motor speed;
    a dither generator for generating a digital dither value;
    an adder for generating a dithered demand code equal to a sum of the dither value and the demand code;
    a position determining circuit for determining a rotational position of the motor; and
    a pulse width modulation controller for generating pulse width modulated drive signals having duty cycles controlled as a function of a stored set of waveform coefficients, the dithered demand code, and the rotational position of the motor.

2. The motor controller of claim 1 wherein the dither generator is a digital up/down counter.

3. The motor controller of claim 1 wherein the digital dither value is selected from a group of signed digital values having a range based on a system sample rate.

4. The motor controller of claim 1 wherein the position determining circuit comprises:
    a period measurement circuit electrically connected to the motor for determining an electrical period of the spindle motor; and
    a state machine for dividing the electrical period of the spindle motor into a plurality of commutation states.

5. The motor controller of claim 1 wherein the pulse width modulation controller comprises:
    a look up table for providing the set of waveform coefficients as a function of the rotational speed of the motor; and
    a multiplier for generating a duty cycle control signal equal to a product of the waveform coefficients and the dithered demand code.

6. The motor controller of claim 1 wherein the set of waveform coefficients define a sinusoidal waveform.

7. The motor controller of claim 1 wherein the motor controller is fabricated in an integrated circuit.

8. A method for generating a pulse width modulated signal for driving a motor, the method comprising:
    determining a rotational position of the motor;
    obtaining a waveform coefficient corresponding to the rotational position of the motor;
    generating a digital dither value;
    adding the digital dither value to a digital demand code for controlling a rotation rate of the motor to obtain a dithered demand code; and
    multiplying the waveform coefficient by the dithered demand code to obtain a duty cycle control signal for controlling a duty cycle of the pulse width modulated signal.

9. The method of claim 8 wherein determining a rotation position of the motor comprises:
    measuring a back electromotive force induced on a terminal of the motor by the rotation of the motor;
    detecting a plurality of zero crossings in the back electromotive force; and
    determining an electrical rotation period of the motor by measuring a time between successive zero crossings in the back electromotive force.

10. The method of claim 9, wherein determining a rotation position of the motor further comprises:
    dividing the electrical period into a plurality of states, wherein a waveform coefficient is associated with each of the plurality of states.

11. The method of claim 8 wherein the digital dither value is selected from a group of signed digital values having a range based on a system sample rate.

12. The method of claim 8 and further comprising:
    generating a periodic waveform; and
    comparing the duty cycle control signal to the periodic waveform to generate the pulse width modulated signal having a duty cycle determined by an amplitude of the duty cycle control signal.

13. The method of claim 12 wherein the periodic waveform is selected from the group consisting of a triangle waveform and a saw-tooth waveform.

14. A controller for controlling a rotation rate of a spindle motor, the controller comprising:
    a period measurement circuit for determining an electrical period of the spindle motor;
    a state machine for dividing the electrical period of the spindle motor into a plurality of commutation states;
    a look up table addressable by the state machine for providing a waveform coefficient for each of the plurality of commutation states;
    a dithered demand generator for generating a dithered demand code by adding a dither value to a received digital demand code indicative of a desired rotational speed of the motor;
    a multiplier for generating a duty cycle control signal equal to a product of the waveform coefficients and the dithered demand code; and
    a pulse width modulator for generating a pulse width modulated drive signal for the motor driver circuit, the pulse width modulated drive signal having a duty cycle defined by the duty cycle control signal.

15. The controller of claim 14 wherein the dither value is selected from a group of signed digital values having a range based on a system sample rate.

16. The controller of claim 14 wherein the dither value is generated by a digital up/down counter.

17. The controller of claim 14 wherein the waveform coefficients contained in the look up table define a sinusoidal waveform.

18. The controller of claim 14 wherein the motor controller is fabricated in an integrated circuit.

19. A pulse width modulator for generating a pulse width modulated signal, the pulse width modulator comprising:
   a state machine for sequencing through a plurality of states;
   a look up table for outputting a digital waveform coefficient as a function of a current state of the state sequencer, wherein the look up table contains a digital waveform coefficient for each of the plurality of states;
   an adder for generating a dithered gain adjust code by adding a digital dither value to a digital gain adjust code; and
   a multiplier for generating a duty cycle control signal equal to a product of the output waveform coefficient and the dithered gain adjust code.

20. The pulse width modulator of claim 19 wherein the digital dither value is selected from a group of signed digital values having a range based on a system sample rate.

21. The pulse width modulator of claim 19 and further comprising:
   a periodic waveform generator; and
   a comparator for comparing the duty cycle control signal to the periodic waveform to generate the pulse width modulated signal having a duty cycle determined by an amplitude of the duty cycle control signal.

22. The pulse width modulator of claim 19 wherein the periodic waveform is selected from the group consisting of a triangle waveform and a saw-tooth waveform.

* * * * *